United States Patent
Kinoshita et al.

(10) Patent No.: US 6,265,525 B1
(45) Date of Patent: Jul. 24, 2001

(54) METHOD AND DEVICE FOR MANUFACTURING POLYCARBONATE

(75) Inventors: Takatoshi Kinoshita; Kazunori Harada; Seiji Motohiro, all of Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/486,913

(22) PCT Filed: Nov. 20, 1998

(86) PCT No.: PCT/JP98/05245

§ 371 Date: Oct. 12, 2000

§ 102(e) Date: Oct. 12, 2000

(87) PCT Pub. No.: WO99/28370

PCT Pub. Date: Jun. 10, 1999

(30) Foreign Application Priority Data

Nov. 28, 1997 (JP) .................................................. 9-327582

(51) Int. Cl.[7] .................................................. C08G 64/00
(52) U.S. Cl. .................................................. 528/196
(58) Field of Search .................................................. 528/196

(56) References Cited

U.S. PATENT DOCUMENTS

| | | | |
|---|---|---|---|
| 3,335,111 | 8/1967 | Pray et al. | 528/196 |
| 3,820,761 | 6/1974 | Rigal | 528/196 |
| 3,830,811 | 8/1974 | Regnier et al. | 260/256.4 |

FOREIGN PATENT DOCUMENTS

| | | |
|---|---|---|
| 47-30675 | 11/1972 | (JP) . |
| 49-14358 | 4/1974 | (JP) . |
| 50-157265 | 12/1975 | (JP) . |
| 62-112623 | 5/1987 | (JP) . |
| 1-230518 | 9/1989 | (JP) . |
| 2-153925 | 6/1990 | (JP) . |
| 6-21159 | 3/1994 | (JP) . |
| 7-242743 | 9/1995 | (JP) . |
| 7-330910 | 12/1995 | (JP) . |
| 8-337648 | 12/1996 | (JP) . |
| 9-291154 | 11/1997 | (JP) . |
| 10-342 | 1/1998 | (JP) . |

*Primary Examiner*—Terressa M. Boykin
(74) *Attorney, Agent, or Firm*—Antonelli, Terry, Stout & Kraus, LLP

(57) ABSTRACT

A process for producing polycarbonate designed to improve the quality of polycarbonate as a polymerization product polymer and reduce the investment and operating costs is provided. Polycarbonate is produced in two horizontal cylindrical agitation reactors provided with agitation blades successively extended through the vessel and partly with agitation blades having a screw function, as horizontally ganged together in series without any agitator center shaft, where the primary agitation reactor is a uniaxial horizontal agitation reactor with the agitation blades rotating at a low speed ranging from 1 rpm to 10 rpm, while keeping a clearance between the inner wall of the vessel ad the agitation blades in a range of 1 mm to 50 mm, and the secondary agitation reactor is a biaxial horizontal agitation reactor with agitation blades provided horizontally and in parallel, without any rotating center shaft, which conducts treatment by agitation at a low speed ranging from 1 rpm to 15 rpm.

5 Claims, 7 Drawing Sheets

METHOD AND DEVICE FOR MANUFACTURING POLYCARBONATE

TECHNICAL FIELD

The present invention relates to a process and an apparatus for producing polycarbonate, which is suitable for producing polycarbonate from diphenyl carbonate and an alcohol such as bisphenol A, etc. as raw materials by transesterification upon mixing with a reaction catalyst and additives such as a color adjustment, etc.

BACKGROUND ART

In a process using vertical agitation reactors as disclosed in "Polycarbonate Resin", page 66, published by Nikkan Kogyo Shinbun, a larger number of agitation reactors are required for continuous production with increasing scale of the facility, rendering the process uneconomical.

From the viewpoint of a model for perfect mixing vessels ganged together in series as an economical apparatus structure, it is effective to use horizontal agitation reactors capable of providing a large number of such perfect mixing vessels.

A spectacle rim-formed polymerization apparatus as disclosed in Fig. 2.49 (b), C1–43, C Engineering section, of Mechanical Engineering Handbook, is a continuous agitation reactor, which can provide ideal extrusion flow characteristics, that is, a large number of perfect mixing vessels as ganged together in series, but the highly viscous liquid, when treated therein, tends to attach to the surface of the agitator center shaft and reside thereon with increasing liquid viscosity. That is, no sharp residence time distribution function curve can be obtained. Its mode is shown by a delta response curve in FIG. 8, which is based on test data on relations between the number of model vessels for perfect mixing vessels as ganged together in series and the residence time distribution function. In the spectacle rim-formed polymerization apparatus, deviation from the theoretical curve occurs around the point where the dimensionless number of time, t/to, exceeds 1.3. This means that a portion of the liquid resides in the dead zone of agitation, resulting in a problem of polymer quality deterioration.

DISCLOSURE OF THE INVENTION

An object of the present invention is to provide a process and an apparatus for producing polycarbonate, which can improve the quality of polycarbonate as a polymerization product polymer.

Another object of the present invention is to provide a process and an apparatus for producing polycarbonate, designed to reduce the investment and operating costs.

According to one aspect of the present invention, a process for producing polycarbonate is provided, which comprises subjecting diphenyl polycarbonate and an alcohol such as bisphenol A, etc. as raw materials to polycondensation reaction at elevated temperatures ranging from 200° C. to 300° C. in vacuum less than or equal to the atmospheric pressure in one or more horizontal cylindrical agitation reactors, as ganged together in series, without any agitator center shaft, with increasing liquid viscosity from 1 Pa·s to 5,000 Pa·s, thereby continuously producing polycarbonate.

BEST MODE FOR CARRYING OUT THE INVENTION

Lattice blade polymerization apparatus is an agitation reactor having rectangular frames as ganged together without any agitator center shaft, as disclosed, for example, in JP-B-6-21159, which can show a curve along the theoretical values.

For continuous treatment of a highly viscous liquid, it is obvious from said fact that agitation blades without any agitator center shaft have a better-miscibility and can contribute to improvement of product liquid quality. Therefore, for continuous production of polycarbonate from diphenyl carbonate and an alcohol such as bisphenol A, etc. as raw materials with elevated liquid viscosity, it is preferable to conduct polycondensation continuously in one or more horizontal cylindrical agitation reactors, as ganged together in series, without any agitator center shaft, at elevated temperature ranging from 200° C. to 300° C. in vacuum less than or equal to the atmospheric pressure with increasing liquid viscosity from 1 Pa·s to 5,000 Pa·s.

Figure 9:
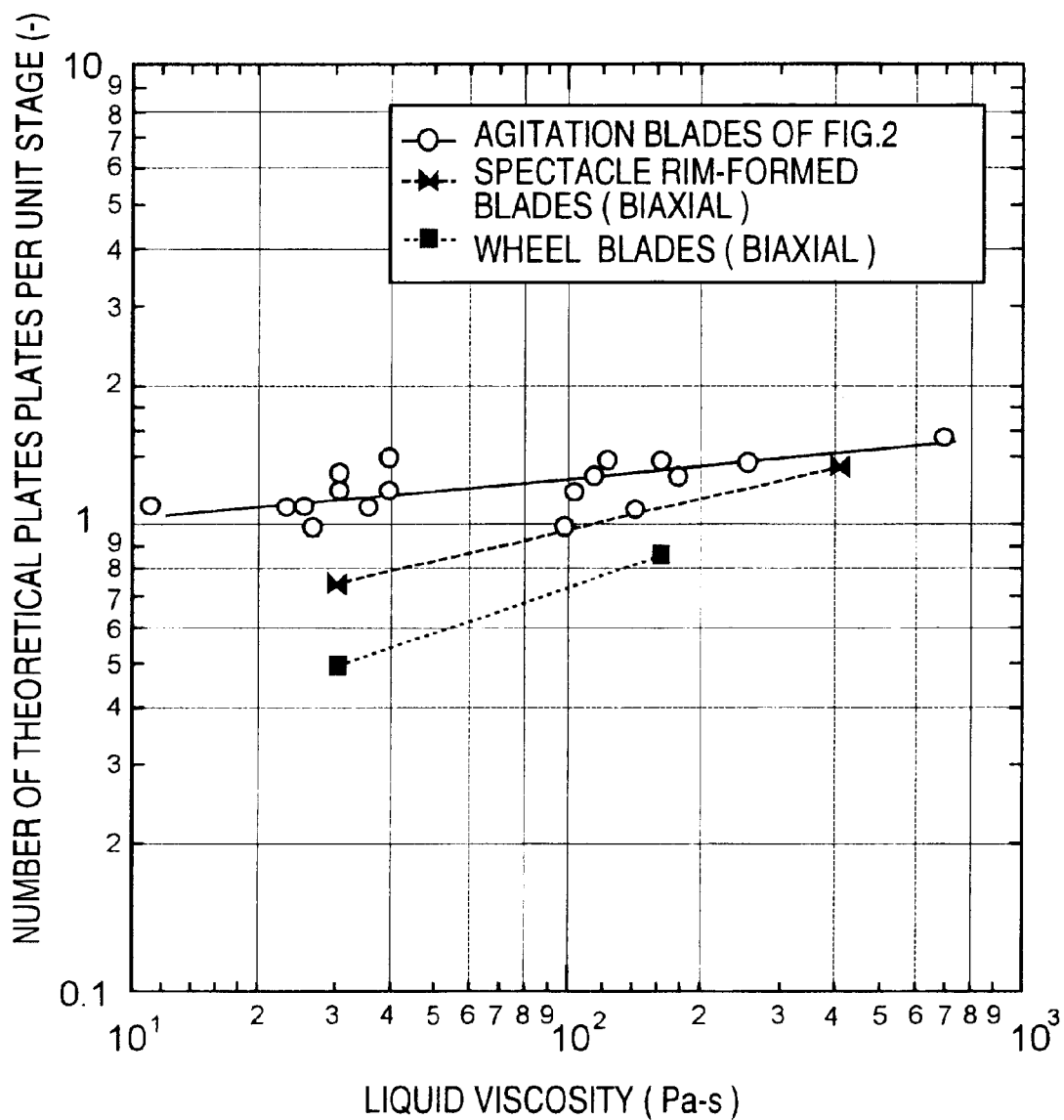
FIG. 9 is a characteristic diagram showing one example of relations between the viscosity and the number of theoretical plates.

FIG. 9 shows test data of miscibilities of various horizontal agitation reactors in comparison.

Figure 10:
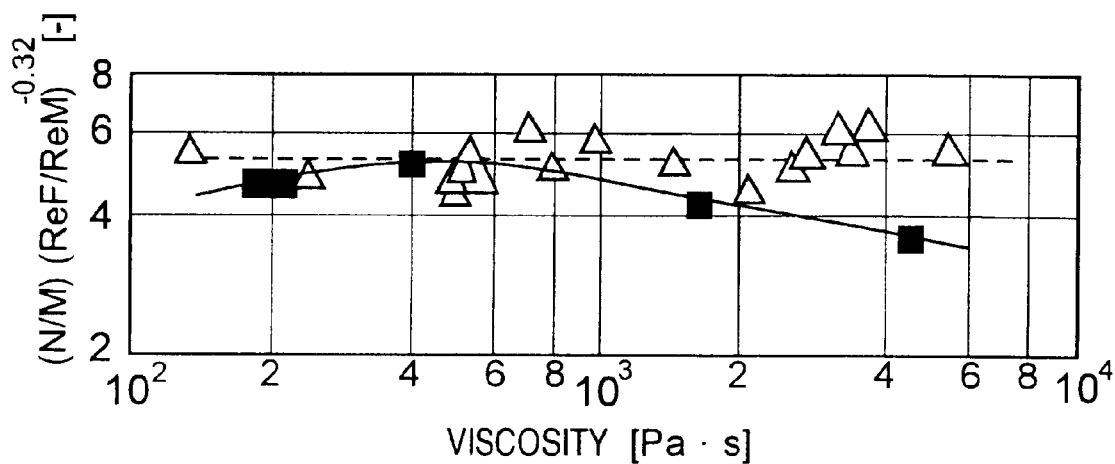
FIG. 10 is a characteristic diagram showing one example of relations between the viscosity and the miscibility.

The larger the number of theoretical plates per unit stage, the better the miscibility and the smaller the apparatus size, i.e. the more economical. In FIG. 9, the uniaxial agitation reactor is an agitation reactor without any agitator center shaft, where agitation blades are continuously extended, while keeping the clearance between the blade outer edges and the inner wall of the vessel in a range of 1 mm–50 mm all over the inner surface of the vessel. It is obvious from the result of said data that the uniaxial agitation reactor can involve larger numbers of perfect mixing vessels than that of the spectacle rimformed polymerization apparatus and thus has a better miscibility. FIG. 10 also shows miscibilities. It is obvious therefrom that at a higher viscosity than 400 Pa·s–600 Pa·s the miscibility of spectacle rim-formed blades becomes poorer than that of lattice blades. That is, it is obvious from the test data of FIGS. 9 and 10 that a horizontal agitation reactor without any agitator center shaft is more effective for treating a highly viscous liquid ranging from 1 Pa·s to 5,000 Pa·s.

Figure 1:
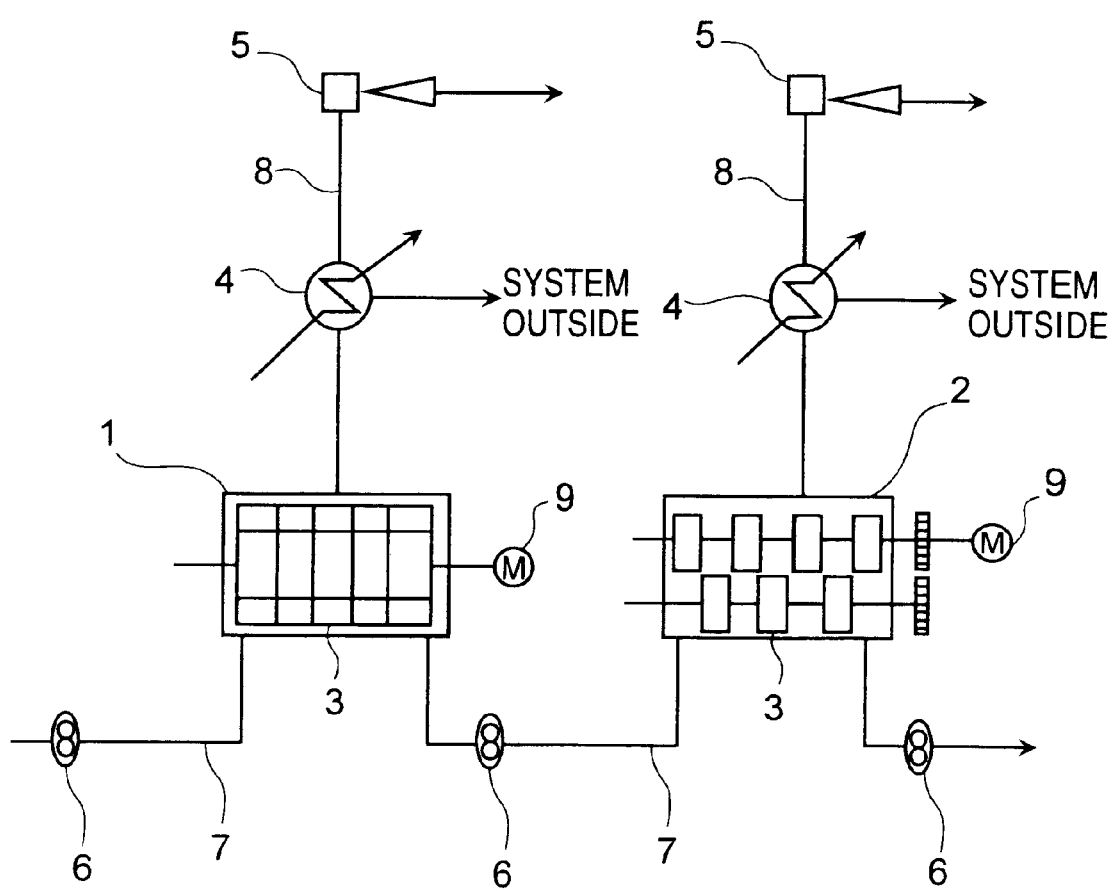
FIG. 1 is a schematic process diagram showing one embodiment of the present process for producing polycarbonate.
Figure 2:
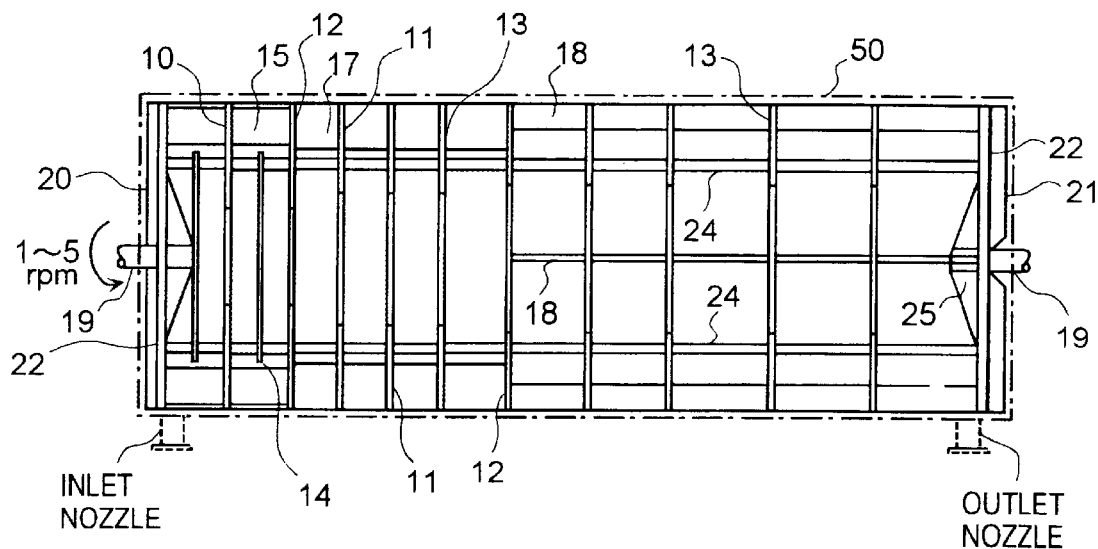
FIG. 2 is a side view showing one embodiment of the agitation blade structure of a primary agitation reactor.
Figure 3:
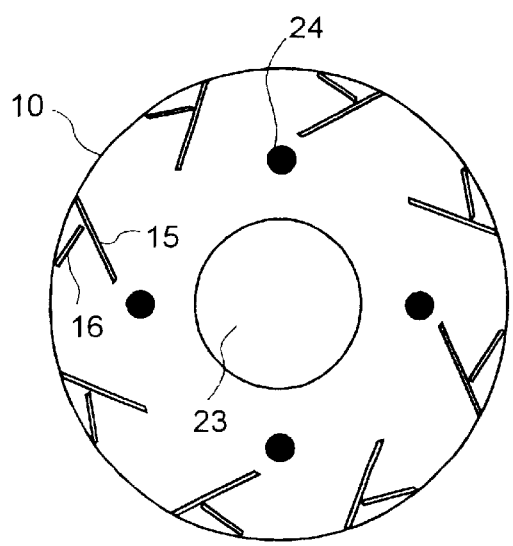
FIGS. 3 to 7 are front views each showing embodiments of partition plates.
Figure 4:
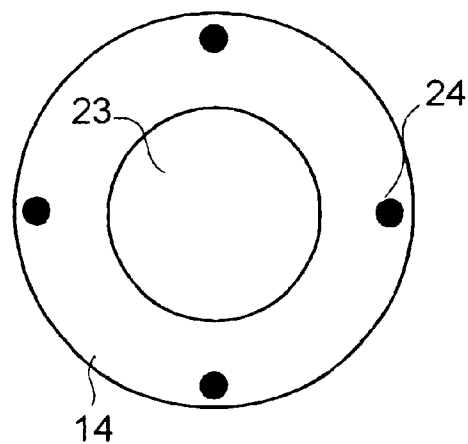
Figure 5:
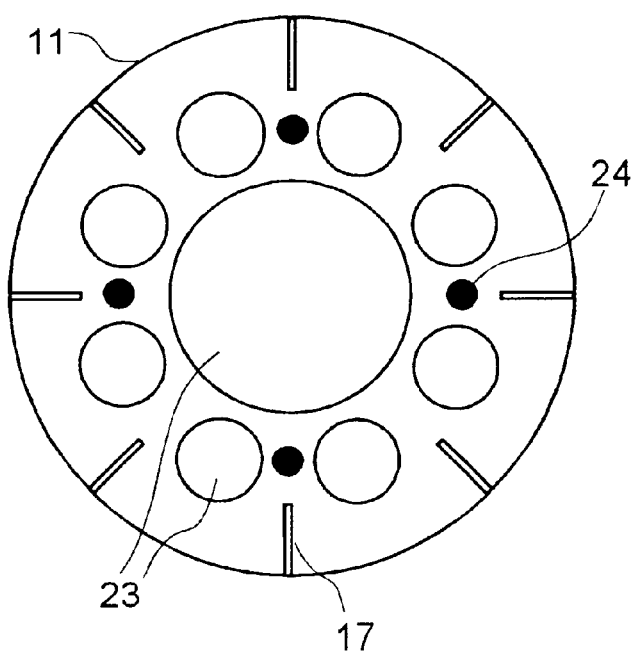
Figure 6:
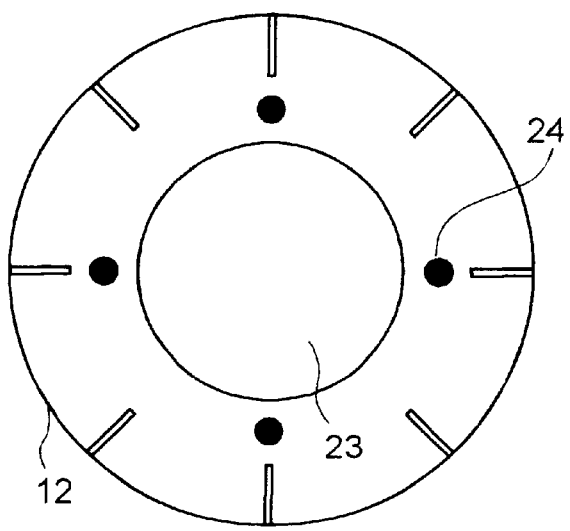
Figure 7:
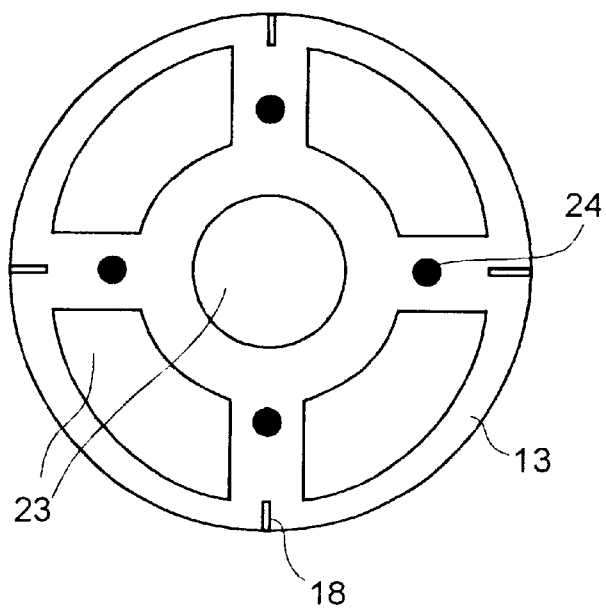
Figure 8:
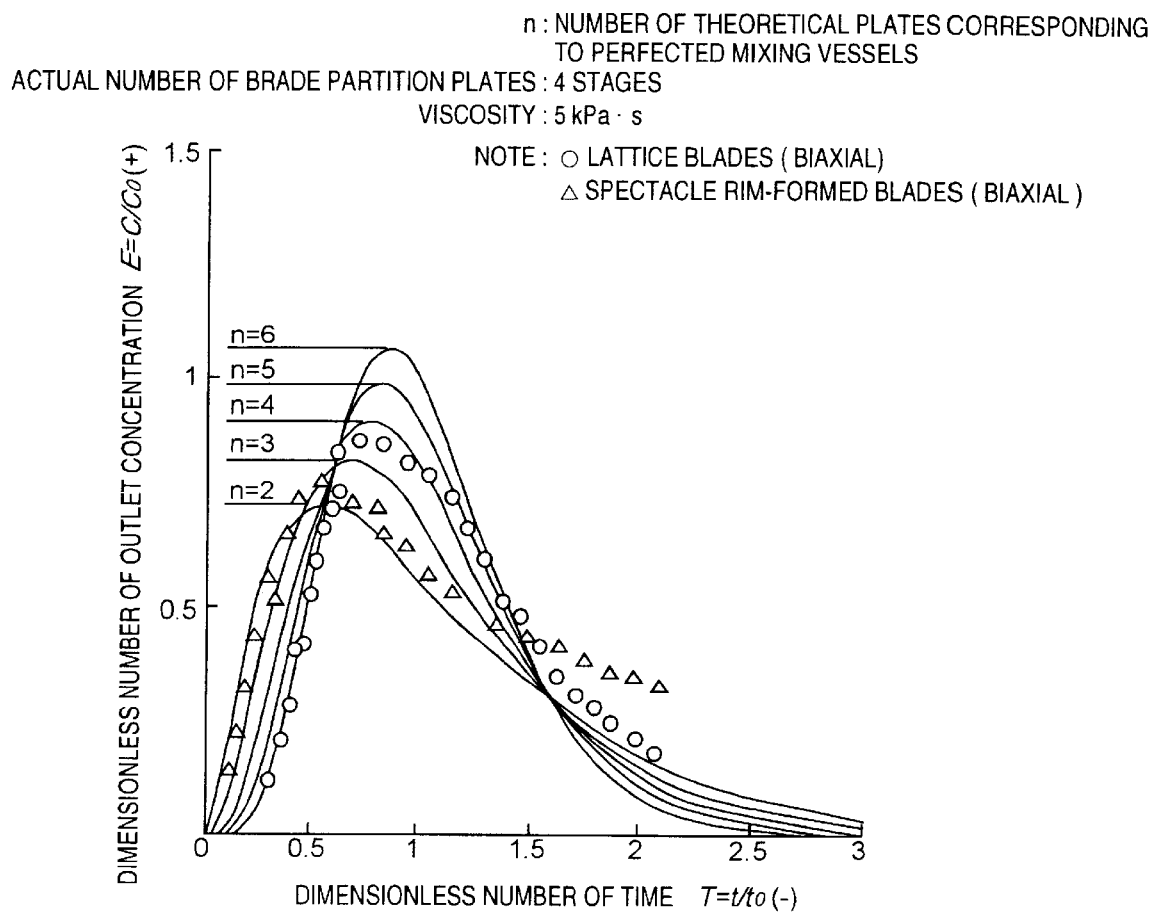
FIG. 8 is a mixing characteristic diagram showing one example of delta response curve.

FIG. 1 shows one embodiment of a process for producing polycarbonate. In a continuous process for producing polycarbonate from diphenyl carbonate and bisphenol A as raw materials by transesterification, the liquid viscosity will increase with the progress of reaction. Prepolymer having a viscosity of 1 Pa·s or higher obtained by the initial polycondensation reaction at the preliminary stage is continuously fed to primary agitation reactor 1 by pump 6. The agitation reactor for this purpose is a horizontal agitation reactor in an agitation structure without any agitator center shaft, as shown, for example, in FIGS. 2 to 7. Rotating axes 19 at both ends are connected to end plates 22, respectively, and both end plates are secured to each other by a few reinforcing members 24. A plurality of blade partition plates 10 to 13 having different shapes depending on liquid viscosity ranges are provided in the vertical direction to reinforcing member 24 between both end plates 22 to prevent the liquid from short pass in the longitudinal direction and arranged at broader and broader distances in proportion to increasing viscosity ranges. Numeral 12 designates an intermediate plate.

Agitation blades 15, 16, 17 and 18 have different blade widths depending upon the liquid viscosity ranges and different numbers of blades provided around the inner wall. Agitation blades are continuously extended and arranged in the longitudinal direction, while keeping small clearances ranging from 1 mm to 50 mm from the inner wall of vessel 50. Rotating axes rotate at a lower speed of 1 rpm–10 rpm in comparison with a speed of 15 rpm–20 rpm as used in the case of the polymerization apparatus with spectacle rim-formed blades. As a result, the agitation power can be reduced to a few tenths. Scraper blades 20 and 21 provided on the outer side of both end plates 22, respectively, have a screw function of pushing the liquid back inwardly, while keeping a small clearance from the inner wall of the vessel proper.

The liquid having a viscosity of about 1,000 Pa·s discharged from the primary agitation reactor 1 is fed to secondary agitation reactor 2 by pump 6. The secondary agitation reactor is a biaxial agitation reactor provided with successively linked agitation blades of rectangular frames horizontally and in parallel without any agitator center shaft, as disclosed in JP-B-6-21159. The reaction further proceeds in this reactor, where the liquid viscosity is elevated to about 5,000 Pa·s, continuously producing polymers.

In both agitation reactors, polycondensation reaction is carried out at elevated temperatures ranging from 200° C. to 350° C. in vacuum ranging from the atmospheric pressure to 0.1 Torr. Phenol as a reaction by product is discharged from the agitation reactors as overhead vapor to the system outside after condensation in condenser 4.

According to another embodiment, the same type as that of primary agitation reactor 1 is used for secondary agitation reactor 2, where blade partition plates having different shapes depending upon the liquid viscosity ranges are arranged at broader and broader distances in proportion thereto. As a result, the agitation power can be further reduced.

According to the present invention, the product liquid quality can be improved by using a horizontal agitation reactor or reactors with successively linked agitation blades without any rotating center shaft. The present invention can also provide a process for producing polycarbonate, which can reduce the investment and operating costs.

What is claimed is:

1. A process for producing polycarbonate, which comprises a first step of subjecting a mixed liquid of diphenyl carbonate and an alcohol such as bisphenol A, etc. to agitating and mixing treatments in a uniaxial horizontal agitation reactor comprising a horizontal cylindrical vessel and agitation blades annularly distributed and successively arranged through the vessel and secured at positions deviated from the rotating axis toward the inner wall of the vessel without any agitator center shaft and a second step of subjecting the mixed liquid from the first step to agitation and mixing treatments in a horizontal biaxial agitation reactor with lattice blades, both steps being carried out at elevated temperatures ranging from 200° C. to 300° C. in vacuum less than or equal to the atmospheric pressure with increasing viscosity from 1 Pa·s to 5,000 Pa·s, thereby conducting polycondensation reaction of the mixed liquid and continuously producing polycarbonate.

2. A process for producing polycarbonate according to claim 1, wherein the uniaxial horizontal agitation reactor is operated with a clearance between the inner wall of the vessel and the agitation blades being kept in a range of 1 mm to 50 mm and at a number of agitating revolution being kept in a range of 1 rpm to 10 rpm and the horizontal biaxial agitation reactor with lattice blades is operated at a number of agitating revolution being kept in a range of 1 rpm to 15 rpm.

3. A process for producing polycarbonate according to claim 1 or 2, where the uniaxial horizontal agitation reactor serves to conduct the treatment for a liquid viscosity ranging from 1 Pa·s to 1,000 Pa·s and the horizontal biaxial agitation reactor with lattice blades serve to conduct the treatment for a liquid viscosity ranging from 100 Pa·s to 5,000 Pa·s.

4. An apparatus for producing polycarbonate, which comprises a uniaxial horizontal agitation reactor without any agitator center shaft comprising a horizontal cylindrical vessel and agitation blades annularly distributed and successively arranged through the vessel and secured at positions deviated from the rotating axis toward the inner wall of the vessel, to which diphenyl carbonate and an alcohol such as bisphenol A, etc. are fed as raw materials, followed by mixing and agitating treatments, and a horizontal biaxial agitation reactor with lattice blades for subjecting the mixed liquid from the uniaxial horizontal agitation reactor to agitating and mixing treatments, the agitating and mixing treatments in the two reactors being conducted at elevated temperatures ranging from 200° C. to 300° C. in vacuum less than or equal to the atmospheric pressure with increasing viscosity from 1 Pa·s to 5,000 Pa·s, thereby conducting polycondensation reaction of the mixed liquid and continuously producing polycarbonate.

5. A non-axial agitation apparatus, which comprises a horizontal cylindrical vessel, agitation blades annularly distributed and successively arranged through the vessel and secured at positions deviated from the rotating axis toward the inner wall of the vessel, screw members for pushing a liquid back inwardly being provided on the agitation blades positioned nearest to the side wall of the vessel.

* * * * *